Figure 1:
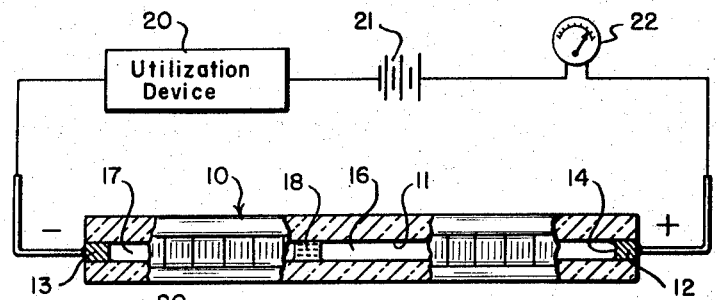

Sept. 19, 1967  C. C. BEUSMAN  3,343,083

NONSELF-DESTRUCTIVE REVERSIBLE ELECTROCHEMICAL COULOMETER

Filed June 10, 1963

INVENTOR
Curtis C. Beusman
BY
ATTORNEYS 3,343,083
NONSELF-DESTRUCTIVE REVERSIBLE ELECTROCHEMICAL COULOMETER
Curtis C. Beusman, Chappaqua, N.Y., assignor to Curtis Instruments, Inc., Mount Kisco, N.Y., a corporation of New York
Filed June 10, 1963, Ser. No. 286,766
8 Claims. (Cl. 324—94)

This invention relates to coulometers or devices for measuring the quantity of current flowing through the device or through a system associated therewith, and more particularly it relates to an electrochemical coulomb measuring device that provides an affirmative electrically detectable indication when a predetermined quantity of current has flowed through the device or through the associated system. Moreover, it relates to an electrochemical coulometer that may be readily adapted to measure the total time of operation of a system associated with the device and to provide an affirmative electrically detectable signal when the associated system has been in operation for a predetermined length of time.

Wherever electrical systems are employed or electrical or mechanical equipment is in continuous or intermittent operation it is often important to provide means for measuring the total quantity of current that flows through the system or to provide means for measuring the total length of time the electrical or mechanical equipment has been in operation. For example, the military services and many industries use systems of preventative maintenance for a variety of electrical and mechanical equipment based on replacement or overhaul of the equipment after a predetermined number of hours of operation. Many types of mechanical and electrical timers and operating cycle counters are presently available but they are generally too large and expensive to be incorporated in each unit of equipment or sub-assembly of large installations of equipment. However, in U.S. Patent 3,045,178, issued July 17, 1962 to Lester Corrsin, there is described a small, rugged and relatively inexpensive coulometer or coulomb measuring device that measures by electrochemical action the quantity of current that flows through the device and that provides visual indication of the net quantity of this current. Moreover, the Corrsin device can be readily adapted to provide a visual indication of the total number of hours that electrical or mechanical equipment associated with the device has been in operation if a unidirectional electric current is passed through the Corrsin coulometer during the periods of operation of the associated equipment.

The Corrsin coulometer or operating time indicator comprises a body of non-conductive material having a bore extending therethrough. Within the bore are two columns of liquid metal each of which extends along the bore from opposite ends thereof but which do not come into physical contact with each other at the adjacent inner ends of the columns of liquid metal. The space in the bore between the adjacent ends of the two liquid metal columns is filled with an appropriate electrolyte solution (generally speaking, an aqueous electrolyte containing a water-soluble ionizable salt of the liquid metal) which is in conductive contact with these ends of the two columns, while the outer ends of the two columns are in conductive contact with electrodes adapted to connect the two columns to an external source of electric potential. As will be readily appreciated, the Corrsin device comprises a miniature electrolytic cell in which, when a unidirectional current is passed therethrough, liquid metal from the metal column at the anodic end of the cell is electrolytically dissolved in the electrolyte and is transported to and electrolytically plated out of the electrolyte onto the liquid metal column at the cathodic end of the cell.

Although the Corrsin coulometer is a rugged and reliable device, care must be taken not to operate the device beyond certain prescribed limits, and in particular a unidirectional current should not be passed through the device for a sufficient time to remove or transfer substantially all of the liquid metal from the anodic end of the device so as to expose the electrode thereat to the aqueous electrolyte. If the aqueous electrolyte contacts the electrode at the anodic end of the Corrsin device, the instrument may be damaged or destroyed due to electrolytic corrosion of the electrode or to electrolytic decomposition of the electrolyte. As a result, the Corrsin device must be inspected regularly to make sure that the liquid metal still covers the anodic electrode or that the electrolyte has not approached too closely this electrode.

I have now made an important improvement in electrochemical coulometers of the type described that overcomes the aforementioned limitations of this instrument and greatly increases the utility and the range of application of the instrument. That is to say, I have found that if the aqueous electrolyte contains an electrolyte salt having certain specific characteristics and if the electrode at the anodic end of the device is formed of a metal having certain specified properties and is of a specified shape, a unidirectional current can be passed through the instrument indefinitely—that is, for more than sufficient time to transfer all of the liquid metal from the anodic end of the device so as to expose the inner surface of the anodic electrode to the electrolyte—without damage to the instrument. Moreover, I have found that when the instrument is operated in this fashion so as to remove substantially all of the liquid metal from the anodic end of the device, the device will provide an affirmative electrically detectable indication of this condition that can be utilized in control circuits and in many other applications. Specifically, the aqueous electrolyte of my new micro-coulometer contains an electrolyte salt the cation of which is an ion of the liquid metal and the anion of which is capable of being anodically oxidized to form a molecule that dissolves in or is assimilated by the aqueous electrolyte and that reacts chemically with the liquid metal to reform the electrolyte salt. In combination with an electrolyte having these characteristics I also use an electrode at the anodic end of the device which presents to the anodic column of liquid metal a substantially planar inner surface normal to the axis of the bore of the instrument and completely filling the cross section of the bore at the plane of contact with that column of liquid metal. Moreover, this electrode is formed of a metal that is non-reactive with respect to the anion of the electrolyte salt and also with respect to the molecule formed by anodic oxidation of this ion, that is insoluble in the liquid metal and that is electrolytically passive when in anodic contact with the aqueous electrolyte. In the preferred embodiment of my invention the liquid metal is mercury, the electrolyte comprises an aqueous solution of mercuric iodine together with one or more alkali metal and alkaline earth metal iodides, and the planar electrodes are made of platinum or stainless steel.

Figure 2:
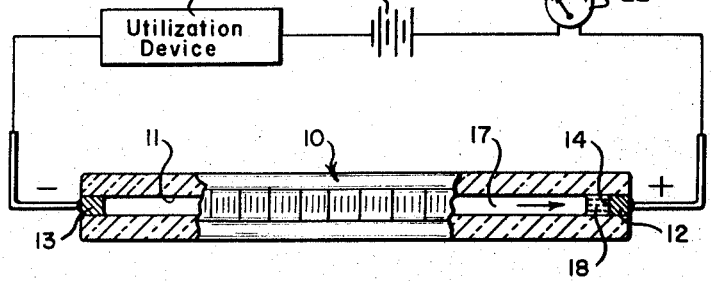
Figure 3:
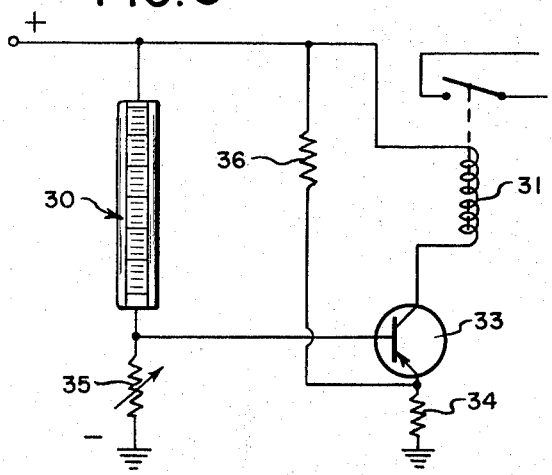
Figure 4:
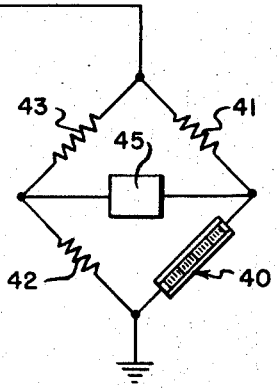
Figure 5:
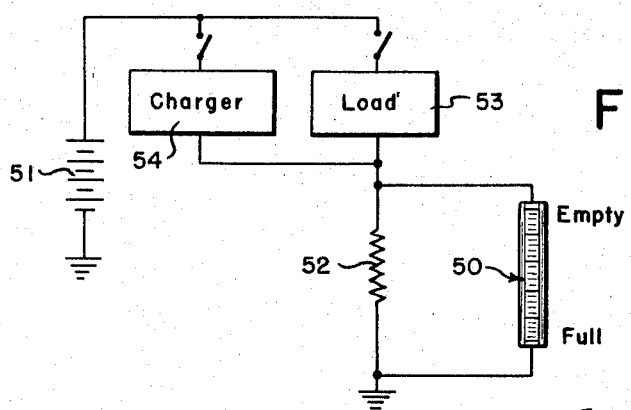

The unique structure and properties of my improved coulometer will be better understood from the following description taken in conjunction with the accompanying drawings of which FIG. 1 is a side elevation, partly in section, of my new coulometer showing the "normal" condition of operation in which the anodic and cathodic electrodes are both in contact with columns of liquid metal, FIG. 2 is a side elevation similar to FIG. 1 showing the "end point" condition of operation in which the anodic electrode is in contact with the aqueous electrolyte, FIG. 3 is a schematic diagram of a transistorized control circuit embodying my new coulometer, FIG. 4 is a schematic diagram of a bridge-type control circuit embodying my new coulometer, and FIG. 5 is a schematic diagram of a circuit in which my new coulometer is employed as a "fuel gauge" for a storage battery.

As shown best in FIG. 1, my new coulometer comprises an elongated body portion 10 of non-conductive material having a bore 11 extending the length of the body portion. The body portion 10 of the device advantageously is made of a transparent non-conductive material such as glass, polymethyl methacrylate or other transparent plastic material, and the diameter of the bore 11 advantageously is sufficiently small to intensify the capillary activity of the liquid metal and electrolyte contained therein. An electrode 12 formed of a metal that is chemically and electrolytically inert with respect to the aqueous electrolyte and that will not dissolve in or form an amalgam with the liquid metal is disposed in the bore 11 at the anodic end of the device, and an electrode 13 formed of a conductive material inert with respect to the liquid metal is disposed in the bore at the cathodic end of the device. The anodic electrode 12 has a substantially planar inner surface 14 that substantially completely fills the cross section of the bore 11, and preferably electrode 13 is identical to electrode 12 so that the device may be operated reversibly with either electrode serving as the anode. A first column 16 of a liquid metal such as mercury is in contact with the electrode 12 at the anodic end of the device, and a second column 17 of the liquid metal is in contact with the electrode 13 at the cathodic end of the device. The two columns of liquid metal extend inwardly toward each other but are separated from each other by a small space or short length of the bore 11 that is completely filled with an aqueous electrolyte 18 containing a water soluble ionizable salt of the liquid metal. Specifically, the aqueous electrolyte contains a salt the cation of which is an ion of the liquid metal and the anion of which is capable of being anodically oxidized to form a molecule that disolves in or is assimiliated by the aqueous electrolyte and that reacts chemically with the liquid metal to reform the electrolyte salt. In the preferred embodiment of my invention the planar electrodes 12 and 13 are made of platinum or stainless steel, the liquid metal is mercury, and the electrolyte comprises an aqueous solution of mercuric iodide together with one or more alkali metal and alkaline earth metal iodides.

It will be readily appreciated from the foregoing description that my coulometer is essentially a small electrolytic cell. Thus, when the device is in its so-called "normal" operating condition—that is, when a column of mercury is in contact with and extends inwardly from both the anodic electrode 12 and the cathodic electrode 13 as shown in FIG. 1—the passage of a unidirectional current through the device will cause mercury from the liquid metal column 16 at the anodic end of the device to be electrolytically dissolved in the electrolyte 18 and to be transported to and electrolytically plated out of the electrolyte on to the liquid metal column 17 at the cathodic end of the device. The effective electrolytic oxidation reaction taking place at the anode may be represented by the equation:

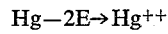

and the effective electrolytic reduction reaction taking place at the cathode may be represented by the equation:

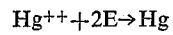

The amount of metal transferred from the liquid metal column 16 at the anodic end of the device to the liquid metal column 17 at the cathodic end of the device during normal operation thereof is directly proportional to the quantity or coulombs of current that is passed through the device, and therefore the change in length of the two metal columns is a direct measure of the quantity of current that has passed through the device. Moreover, if the strength or amperage of the current passing through the cell is known, the change in length of the two columns of liquid metal—or the change in position of the electrolyte gap in the bore 11—is a direct measure of the length of time that this current has been flowing through the device. Thus, when the device is in the normal operating condition as shown in FIG. 1, and by appropriate electrical connections to associated equipment or systems and appropriate calibration of the instrument itself, my coulometer may be used as a simple and reliable indicator of the total time of operation of the associated equipment or systems.

The device will continue to operate in its normal manner until substantially all of the liquid metal at the anodic end of the device has been transferred to the column of liquid metal 17 at the cathodic end of the device. However, when there is no more liquid metal at the anodic end as shown in FIG. 2, a significant change takes place in the character or type of electrolytic reaction that is referred to herein as the "end point" operation of the device.

As previously noted, the anodic electrode 12 has a substantially planar inner surface 14 that completely fills the cross section of the bore 11 of the device, and this electrode is formed of a metal such as platinum that does not react either chemically or electrolytically with the electrolyte. As a consequence, the electrolytic reaction that takes place at the anode when the device is in its so-called "end point" operating condition involves anodic oxidation of the anion of the electrolyte salt. Thus, when the electrolyte salt is mercuric iodide, iodide ions will be oxidized to free iodine at the anode 12. However, each molecule of free iodine thus formed combines or complexes with an excess iodide ion to form a complex tri-iodide ion which remains in solution in the electrolyte and diffuses throughout the electrolyte. Mercury ions continue to be electrolytically reduced at the cathodic end of the device during "end point" operation to form elemental mercury in an amount stoichiometrically equivalent to the amount of free iodine formed at the anode. However, as the tri-iodide ion diffuses throughout the electrolyte, it comes into contact with the liquid elemental mercury at the cathodic end of the device and thereupon reacts with this liquid mercury to reform an equivalent amount of the electrolyte salt. The effective electroyltic and chemical reactions taking place at the anode during end point operation may be represented by the following equations:

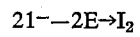

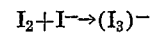

and the effective electrolytic and chemical reactions taking place at the cathode may be represented by the following equations:

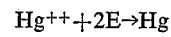

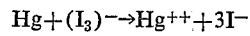

Thus, it will be seen that the net result of end point operation is an equilibrium condition wherein iodide ions are converted to free iodine at the anode and an equivalent amount of iodine is reconverted to the original number of iodide ions at the cathode. There is no transfer of material (e.g., mercury) through the device during end point operation, and the electrolyte gap stands still. Moreover, there is no gas generation or formation of irreversible reaction products that can cause the device to stop functioning or that can destroy the essential reversibility of the overall electrolytic process.

An important concomitant of the change in the character of the electrolytic reaction that takes place when the electrolyte 18 reaches the anodic electrode 12 and the device changes from its normal to its end point operating condition is a significant increase in the impedance or internal resistance of the device. That is to say, when the device changes from a mercury cell to an iodine/mercury cell the potential required to drive a constant amount of current through the cell measurably increases due to the dissimilar nature of the two electrodes involved in end point operation. Thus, when a typical coulometer of my invention is in its normal operating condition it operates as a mercury cell having an internal resistance or impedance of about 6000 ohms, and when the device changes to its end point operating condition it operates as an iodine/mercury cell having an internal resistance of about 50,000 ohms. The absolute value of the internal resistance or impedance of a specific coulometer during normal and end point operation will, of course, depend upon the tube bore diameter, electrolyte gap length, electrolyte composition and electrolyte temperature as well as the electrochemical factors contributing to cell impedance. However, in the case of a typical coulometer of my invention the impedance of the coulometer increases about eightfold when the device changes from normal to end point operation, and this significant increase in impedance provides an affirmative electrically detectable indication that the electrolyte 18 has come into contact with the anodic electrode 12.

The ability of my new coulometer to measure or integrate the quantity of current that flows through the device and to provide an affirmative electrically detectable signal when end point operation is reached makes possible a wide range of important applications of the device. For example, it may be employed as a current integrator to measure the total amount of a variable current flowing through the device or through an electrical system associated therewith, as an operating time indicator to measure the total time that a uniform current flows through the device or through an associated system, as the timer component of a time delay switch, as a "fuel gauge" for a rechargeable storage battery, and as a component of control systems for a myriad of other electrical and mechanical devices. The essential operative characteristics of my coulometer—namely, the measurement of the amount of current flowing through the device and the electrically detectable indication of the change from normal to end point operation—are illustrated by the simple schematic circuit shown in FIGS. 1 and 2.

In the circuit shown in FIGS. 1 and 2 the coulometer is connected in series with a utilization device 20 (for example, an electric motor), a source of power 21 (for example, a storage battery) and means 22 (for example, an ammeter) for indicating any change in the over-all resistance of the circuit or in the internal resistance of the components thereof. When the coulometer is in its normal operating condition as shown in FIG. 1—that is, when a column of liquid mercury 16 is in contact with the planar inner surface 14 of the anodic electrode 12— the device operates as a simple mercury cell having a relatively low internal resistance as previously described, the relatively low internal resistance of the cell being indicated by the relatively high reading of the ammeter 22. Moreover, as long as the device continues to operate in its normal manner the change in length of the two columns of mercury, or the change in position of the electrolyte gap, provides a direct measure of the quantity of current that has flowed through the device, and if the current is of uniform strength the change in length of the mercury columns provides a direct measure of the time this current has been flowing through the system.

On the other hand, when the coulometer is in its end point operating condition as shown in FIG. 2—that is, when the aqueous electrolyte 18 is in contact with the planar inner surface 14 of the anodic electrode 12—the device operates as an iodine/mercury cell having a relatively high internal resistance as previously described, the relatively high internal resistance being indicated by the relatively low reading of the ammeter 22. During end point operation physical transfer of mercury from the anodic to the cathodic end of the device cannot take place and movement of the electrolyte gap comes to a halt. Moreover, the significant, electrically detectable increase in impedance of the device that takes place during end point operation may be usde to activate electronic control devices such as those hereinafter described.

In the variable direct current time delay switch shown in FIG. 3, the "end point" increase in the internal resistance of my coulometer 30 in this transistorized circuit is made use of to energize the relay coil 31 of the time delay switch. As will be seen, one end of the relay coil 31 is connected to a source of potential and its other end is connected through a NPN transistor 33 and a resistor 34 to ground. The anodic end of the coulometer 30 is also connected to the source of potential and the cathodic end thereof is connected through a variable resistor 35 to ground. The base of the transistor 33 is connected to the cathodic end of the coulometer 30, and a shunt resistor 36 is also provided in the circuit as shown in the drawing. By appropriate selection of the impedance of the various components of the circuit, the potential bias on the base of the transistor 33 will remain sufficiently high to prevent activation of the coil 31 as long as the coulometer 30 remains in its normal, low impedance, operating condition. However, after a predetermined length of time or after a predetermined quantity of current has passed through the coulometer, the device will reach its end point, high impedance, operating condition and the bias on the base of the transistor 33 will drop so that the relay coil 31 will be energized. In a typical application where the direct current potential is 28 volts, a 2N388 NPN type transistor is employed for the transistor 33, the resistor 34 has an impedance of 68 ohms, the variable resistor 35 has a maximum impedance of 25,000 ohms and the shunt resistor 36 has an impedance of 1000 ohms.

In the current integrating control circuit shown in FIG. 4, one of my new coulometers 40 and three resistors 41, 42 and 43 all having substantially the same impedance are arranged in the form of a conventional bridge, and a sensitive current detector 45 (such as a meter relay or transistor sensor) is connected to the inner junctions of the bridge as shown in the drawing. As will be readily appreciated, there will be no detectable current flowing through the current detector 45 as long as the coulometer 40 is in its normal operating condition. However, when the algebraic sum of the ampere hours of current flowing through the coulometer in one direction exceeds the predetermined limit, the internal resistance of the coulometer 40 increases approximately eightfold thus unbalancing the bridge and causing the current detector 45 to deflect or otherwise respond and fire a control relay in a manner well known in the art.

In the battery life indicator shown in FIG. 5 of the drawing, one of my new coulometers 50 is employed as a "fuel gauge" for the rechargeable storage battery 51 associated therewith, the position of the electrolyte gap between the two columns of mercury in the coulometer 50 indicating the number of ampere hours of charge remaining in the storage battery 51. The coulometer 50 is connected across a shunt 52 in series with the battery 51 and also in series with a variable load 53 or a battery charger 54. When the battery 51 is being discharged due to the energy requirements of the load 53 the electrolyte gap in the coulometer 50 moves from the end of the coulometer marked "full" toward the end marked "empty," and when the battery is being recharged by the charger 54 the electrolyte gap reverses its direction of travel and moves toward the end of the coulometer marked "full." As the load or the charging current varies, the voltage across the shunt 52 and the current flowing through the coulometer 50 varies directly therewith so that the electrolyte gap in the coulometer 50 will travel toward the "empty" and "full" marks a distance directly proportional to the number of ampere hours that have flowed through the coulometer during the respective discharge or charge cycles. The coulometer 50 thereby provides a continuous and reliable visual indication of the condition or state of charge of the battery 51 associated therewith.

An important advantage of my new coulometer as a fuel gauge for rechargeable storage batteries is the ability of the device to operate at its end point condition indefinitely without harm to the device and without irreversible changes in the composition of the electrodes and electrolyte of the device. That is to say, when a storage battery is recharged the charge cycle generally adds between 20 to 25% more energy into the battery than was supplied by the battery during the preceding discharge cycle. This excess or "topping" charge would cause irreparable damage to or destruction of prior electrochemical coulometers. However, when the electrolyte gap in my new coulometer reaches the planar electrode at the end of the device marked "full," movement of the gap stops and a non-destructive, completely reversible electrolytic reaction takes place. As a consequence a topping charge can be added to the battery 51 without damage to the "fuel gauge" coulometer 50 associated therewith.

From the foregoing description of my new microcoulometer it will be seen that I have made an important contribution to the art to which my invention relates.

I claim:
1. An electrochemical device for measuring the quantity of an electric current that flows through an electrical circuit operatively connected to the device, the internal impedance of the device changing significantly when a predetermined quantity of current has flowed therethrough, said device comprising:
   a body of non-conductive material having a void therein,
   anode and cathode electrode means disposed at spaced locations in communication with said void,
   an electrolytically platable metal deposited on the surface of at least one of the electrode means in communication with said void, said deposit of electrolytically platable metal extending toward the other electrode means a distance such that a space unoccupied by said metal exists in the void,
   an electrolyte in said void completely filling said space, said electrolyte comprising an aqueous solution of an ionizable electrolyte salt the cation of which is an ion of the electrolytically platable metal and the anion of which is capable of being anodically oxidized to form a molecule that is assimilated by the aqueous electrolyte and that reacts chemically with the electrolytically platable metal to reform the electrolyte salt, thereby forming with said electrode means a first electrolytic cell upon the flowing of the electrical current therethrough,
   the electrode means being spaced apart a distance such that when all of the electrolytically platable metal is deposited on the surface of the cathode electrode means the anode electrode means is separated from said deposit by the electrolyte disposed in the space between said electrode means, said anode electrode means being formed of a metal that is non-reactive with respect to the anion of the electrolyte salt and with respect to the molecule formed by anodic oxidation of this anion, that does not alloy with the electrolytically platable metal electrodeposited thereon, and that is electrolytically passive when in anodic contact with the aqueous electrolyte, and that is in a form such that, when all the electrolytically platable metal is deposited on the surface of the cathode electrode means, it has an exposed anode surface in said electrolyte sufficient to form, with said cathode electrode means and said electrolyte, a second electrolytic cell operable in an equilibrium cyclic fashion without the generation of gas and formation of irreversible reaction product and having an impedance substantially different from said first electrolytic cell whereby the end-point of the electrochemical device is determined upon the change of the impedance.

2. An electrochemical device according to claim 1 wherein the electrode means has a substantially planar inner surface normal to the axis of the void and completely filling the cross section of the void.

3. The device according to claim 1 in which the electrolytically depositable metal is mercury, and in which the electrolyte salt is mercuric iodide.

4. The device according to claim 1 in which the electrolytically depositable metal is mercury, and in which the electrolyte comprises an aqueous solution of mercuric iodide and at least one salt selected from the group consisting of alkaline earth metal iodides and alkali metal iodides.

5. The device according to claim 1 in which the planar electrode means is formed from a metal selected from the group consisting of platinum and nickel-steel alloys.

6. The device according to claim 2 in which the electrolytically platable metal is mercury and the electrolyte comprises an aqueous solution of mercuric iodide and in combination therewith is means for detecting the change of impedance and for reversing the flow of the current.

7. The device according to claim 2 in which the electrolytically platable metal is mercury and the electrolyte comprises an aqueous solution of mercuric iodide and at least one salt selected from the group consisting of alkaline earth metal, iodides and alkali metal iodides and in combination therewith is means for detecting the change of impedance and for reversing the flow of the current.

8. The device according to claim 2 in which the planar electrode is formed of a metal selected from the group consisting of platinum and nickel-steel alloys and in combination therewith is means for detecting the change of impedance and for reversing the flow of the current.

References Cited

UNITED STATES PATENTS

| | | | |
|---|---|---|---|
| 2,655,634 | 10/1953 | Kroko | 324—68 |
| 2,945,398 | 7/1960 | Mullarkey | 324—94 X |
| 3,045,178 | 7/1962 | Corrsin | 324—94 X |

RUDOLPH V. ROLINEC, *Primary Examiner.*

WALTER L. CARLSON, *Examiner.*

G. L. LETT, E. F. KARLSEN, *Assistant Examiners.*